United States Patent [19]
Bates

[11] Patent Number: 5,934,432
[45] Date of Patent: Aug. 10, 1999

[54] ACTUATOR SYSTEM FOR VEHICLE AUTOMATED CLUTCHES WITH ELECTRIC MOTOR ACTUATOR AND PRESSURIZED FLUID OVERRIDE

[75] Inventor: Ian Richard Joseph Bates, Huddersfield, United Kingdom

[73] Assignee: Eaton Corporation, Cleveland, Ohio

[21] Appl. No.: 08/917,303

[22] Filed: Aug. 25, 1997

[30] Foreign Application Priority Data

Aug. 28, 1996 [GB] United Kingdom .................. 9617930

[51] Int. Cl.$^6$ ............................ F16D 19/00; F16D 13/44; F15B 7/00; F01B 31/14
[52] U.S. Cl. ........................ 192/85 C; 192/91 R; 60/533; 92/13.1
[58] Field of Search .................... 192/90, 91 R, 192/84.6, 83, 85 C; 60/533, 565, 547.1; 92/13.1, 13.6

[56] References Cited

U.S. PATENT DOCUMENTS

| | | |
|---|---|---|
| 4,081,065 | 3/1978 | Smyth . |
| 4,361,061 | 11/1982 | Smyth . |
| 4,646,620 | 3/1987 | Buchl ..................... 92/13.1 X |
| 4,651,855 | 3/1987 | Grunberg . |
| 4,981,202 | 1/1991 | Leigh-Monstevens et al. .......... 192/92 |
| 5,016,521 | 5/1991 | Haka ......................... 92/13.1 |
| 5,048,656 | 9/1991 | Braun . |
| 5,273,143 | 12/1993 | Voss et al. .............................. 192/3.58 |
| 5,390,497 | 2/1995 | Cottam ...................................... 60/533 |
| 5,441,137 | 8/1995 | Organek et al. . |

FOREIGN PATENT DOCUMENTS

| | | | |
|---|---|---|---|
| 493992 | 7/1992 | European Pat. Off. ............. | 192/85 C |
| 94/07048 | 9/1992 | WIPO .................................. | 192/85 C |

*Primary Examiner*—Charles A. Marmor
*Assistant Examiner*—Brandon C. Stallman
*Attorney, Agent, or Firm*—Howard D. Gordon

[57] ABSTRACT

An actuator system (31) for controlling engagement and disengagement of an automated vehicular master clutch (C). The system includes an electric motor (86) controlled actuator (62) for precision positioning of the clutch and a pneumatically controlled override actuator (54) for rapidly disengaging the clutch, regardless of positioning of the electric motor-controlled actuator. Both the electric motor-controlled actuator and the pneumatically controlled override actuator are operated in accordance with command output signals from a system control unit (31).

11 Claims, 3 Drawing Sheets

5,934,432

ACTUATOR SYSTEM FOR VEHICLE AUTOMATED CLUTCHES WITH ELECTRIC MOTOR ACTUATOR AND PRESSURIZED FLUID OVERRIDE

BACKGROUND OF THE INVENTION

1. Field of the Invention

The present invention relates to an actuator system for controlling a vehicular automated clutch and, in particular, relates to an actuator system utilizing an electric motor-controlled actuator and having a pressurized fluid-operated override mechanism for effecting rapid clutch movements not requiring precise control. In particular, a preferred embodiment of the present invention relates to an actuator system for a dry plate vehicular master clutch having an electric motor-controlled ball screw mechanism for precision positioning of the clutch, as is required during vehicle launch conditions, and having a solenoid-controlled pneumatic override actuator for rapidly disengaging the clutch and/or for moving the clutch from a fully disengaged position to the touch point or point of incipient engagement.

2. Description of the Prior Art

Automated vehicular master clutches and the controls and actuators therefor are known in the prior art, as may be seen by reference to U.S. Pat. Nos. 4,650,056; 4,638,898; 4,671,394; 4,712,658; 4,852,419; 4,874,070; 5,293,316; 5,314,050; 5,337,868 and 5,337,874, the disclosures of which are incorporated herein by reference. The automated clutches could be used with manual and/or fully or partially automated transmissions and could be used for dynamic shifting and/or vehicle launch (i.e., start-from-stop) operations, as may be seen by reference to U.S. Pat. Nos. 4,081,065; 4,361,060 and 4,648,290, the disclosures of which are incorporated herein by reference. As in known, vehicle launch and inching operations usually require more precise clutch control than is required during dynamic shifting operations.

Typically, the prior art devices included a clutch control member moved in one direction to cause engagement and in the opposite direction to cause disengagement of the controlled clutch.

While the prior art clutch actuator mechanisms were generally satisfactory, they were subject to improvement, as it was difficult to obtain both the rapid actuator movement desired for dynamic disengagement and/or movement to the touch point, and the delicate, fine control desired for inching and start-from-stop operations. While electric motor-based actuators, often associated with ball screw or ball ramp mechanisms, provided fine controls, they tended to be somewhat slow for disengagements and rapid movement to the touch point, and while pneumatic controls, even when using both fine and coarse valving, gave satisfactory speed, they were not as controllable as desired in certain situations.

SUMMARY OF THE INVENTION

In accordance with the present invention, the drawbacks of the prior art are minimized or overcome by the provision of an actuator system for a vehicular automated master clutch, such as a dry plate friction clutch, including an electric motor-actuated actuator for controlling both engagement and disengagement movements of the clutch control member and a fluid-actuated override which is effective to override the electric motor-actuated actuator and control movement of the clutch control member in only the disengagement direction of movement thereof relative to the position set by the electric motor-actuated actuator.

Accordingly, it is an object of the present invention to provide a new and improved actuator assembly for an automated vehicular master clutch.

This and other objects and advantages of the present invention will become apparent from a reading of the following description of the preferred embodiment taken in connection with the attached drawings.

DESCRIPTION OF THE PREFERRED EMBODIMENT

Figure 1:
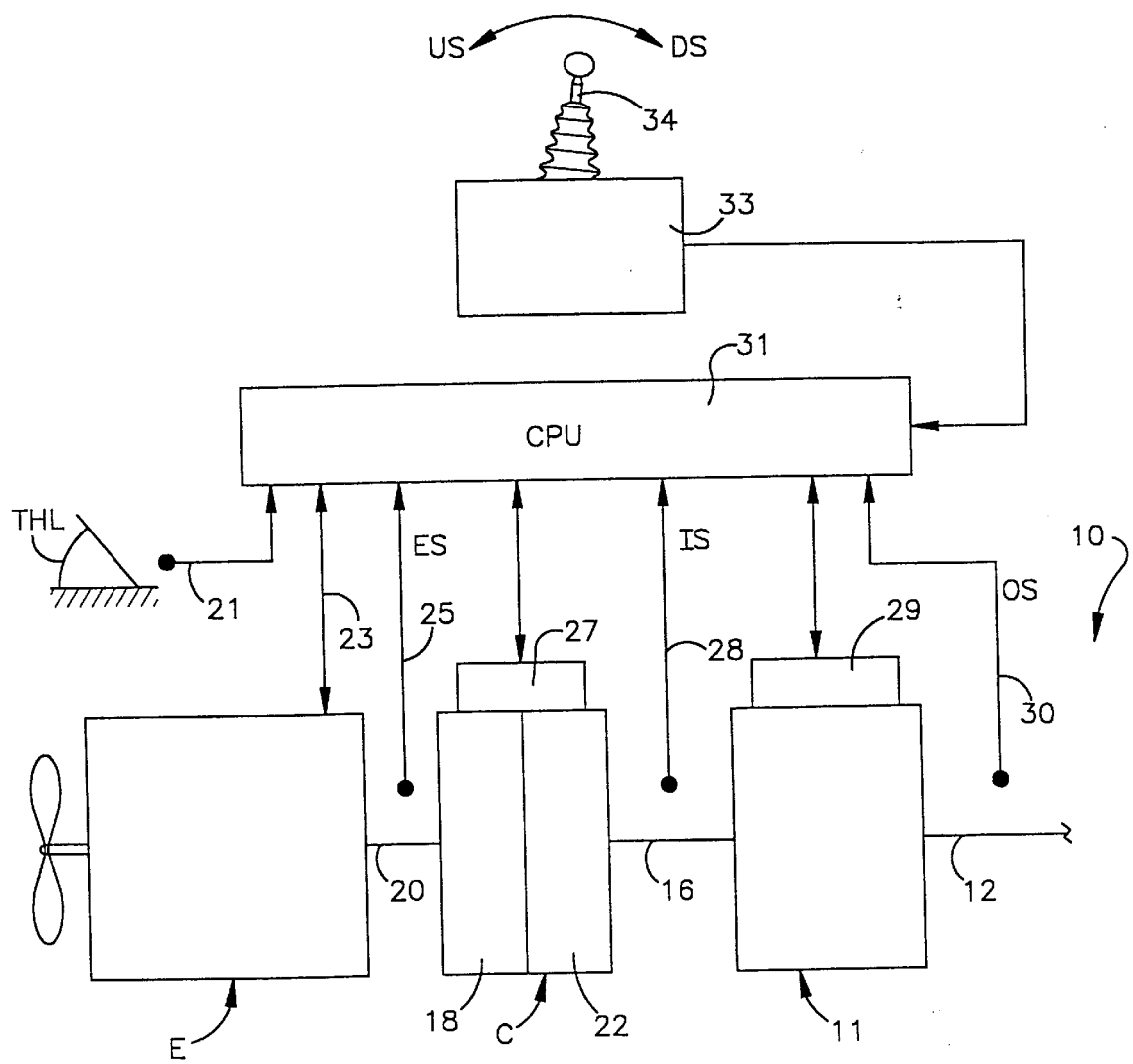
FIG. 1 is a schematic illustration of an automated mechanical transmission system utilizing the clutch actuator system of the present invention.

A vehicular automated mechanical transmission system 10 of the type particularly well suited to utilize the clutch actuator system of the present invention is schematically illustrated in FIG. 1. Fully and partially automated mechanical transmission systems are well known in the prior art, as may be seen by reference to U.S. Pat. Nos. 4,361,060; 4,648,290 and 5,136,897, the disclosures of which are incorporated herein by reference.

The vehicular automated mechanical transmission system 10 includes an automated multiple-speed, change-gear transmission 11 driven by a fuel-controlled engine E, such as a well-known diesel engine, through a coupling such as a friction master clutch C. The output of the automated transmission 11 is output shaft 12, which is adapted for driving connection to an appropriate vehicle component, such as the differential of a drive axle, a transfer case or the like, as is well known in the prior art.

The crankshaft 20 of engine E will drive the driving plates 18 of master friction clutch C, which are frictionally engageable to driven plates 22 for driving the input shaft 16 of transmission 11.

The aforementioned powertrain components are acted upon and/or monitored by several devices, each of which will be discussed briefly below. These devices include a throttle pedal position or throttle opening monitor assembly 21, which senses the operator's set position of the operator-controlled throttle device THL, a fuel control device 23 for controlling the amount of fuel to be supplied to engine E, engine speed sensor 25 which senses rotational speed (ES) of the engine, clutch operator 27 which engages and disengages master clutch C, which also may provide information as to the status of a clutch, an input shaft speed sensor 28 for sensing the rotational speed (IS) of the input shaft 16, a transmission operator 29, which is effective to shift the transmission 11 into a selected target gear ratio and/or to provide a signal indicative of the gear neutral and/or currently engaged gear ratio, and an output shaft speed sensor 30 for sensing the rotational speed (OS) of output shaft 12.

The aforementioned devices supply information to and/or accept command signals from the central processing unit or electronic processing unit 31. The central processing unit 31 may include analog and/or digital electrical calculation and logic circuitry. Preferably, the central processing unit will be microprocessor based, an example of which may be seen by reference to U.S. Pat. No. 4,595,986, the disclosure of which is incorporated herein by reference. The central processing unit 31 also will receive information from a shift control assembly 33 including a manually operated shift lever 34, which may be selectively moved in the upshift (US) or downshift (DS) direction for selecting singular or multiple downshifts from the currently engaged gear ratio. Alternately, the shift control assembly 33 may be of a more standard "P-R-N-D-L" type or the like.

Drive train components and controls therefor of the type described above are well known in the prior art and may be appreciated in greater detail by reference to U.S. Pat. Nos. 4,595,786; 4,576,065 and 4,445,393, the disclosures of which are incorporated herein by reference. The sensors may be of any known type of construction for generating analog or digital signals proportional to the parameters monitored thereby. Similarly, operators 23 and 29 may be of any known electric, hydraulic, pneumatic or electro-pneumatic type for executing operations in response to command output signals from the central processing unit 31.

Figure 2:
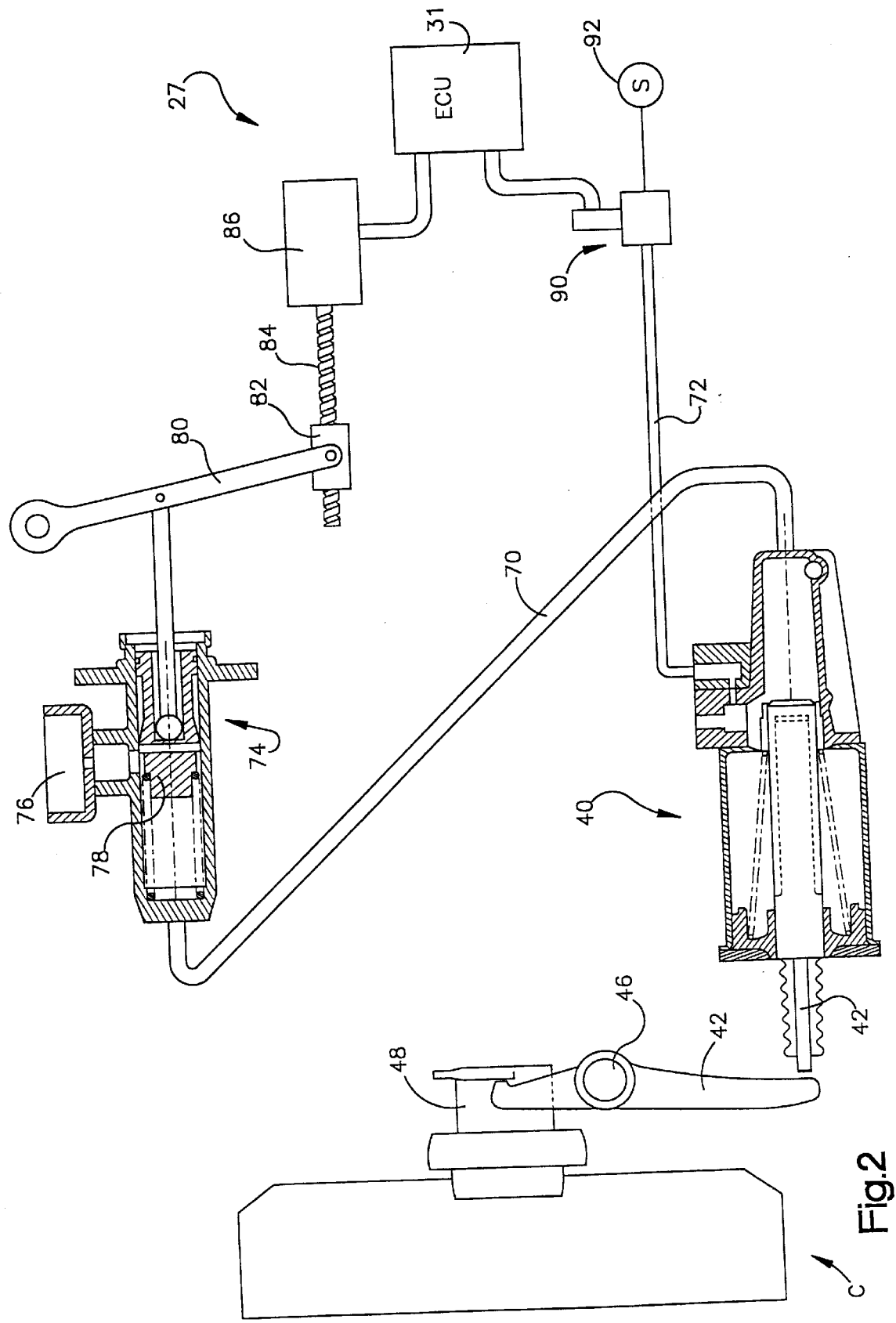
FIG. 2 is a schematic illustration of the automatic clutch actuator system of the present invention.
Figure 3:
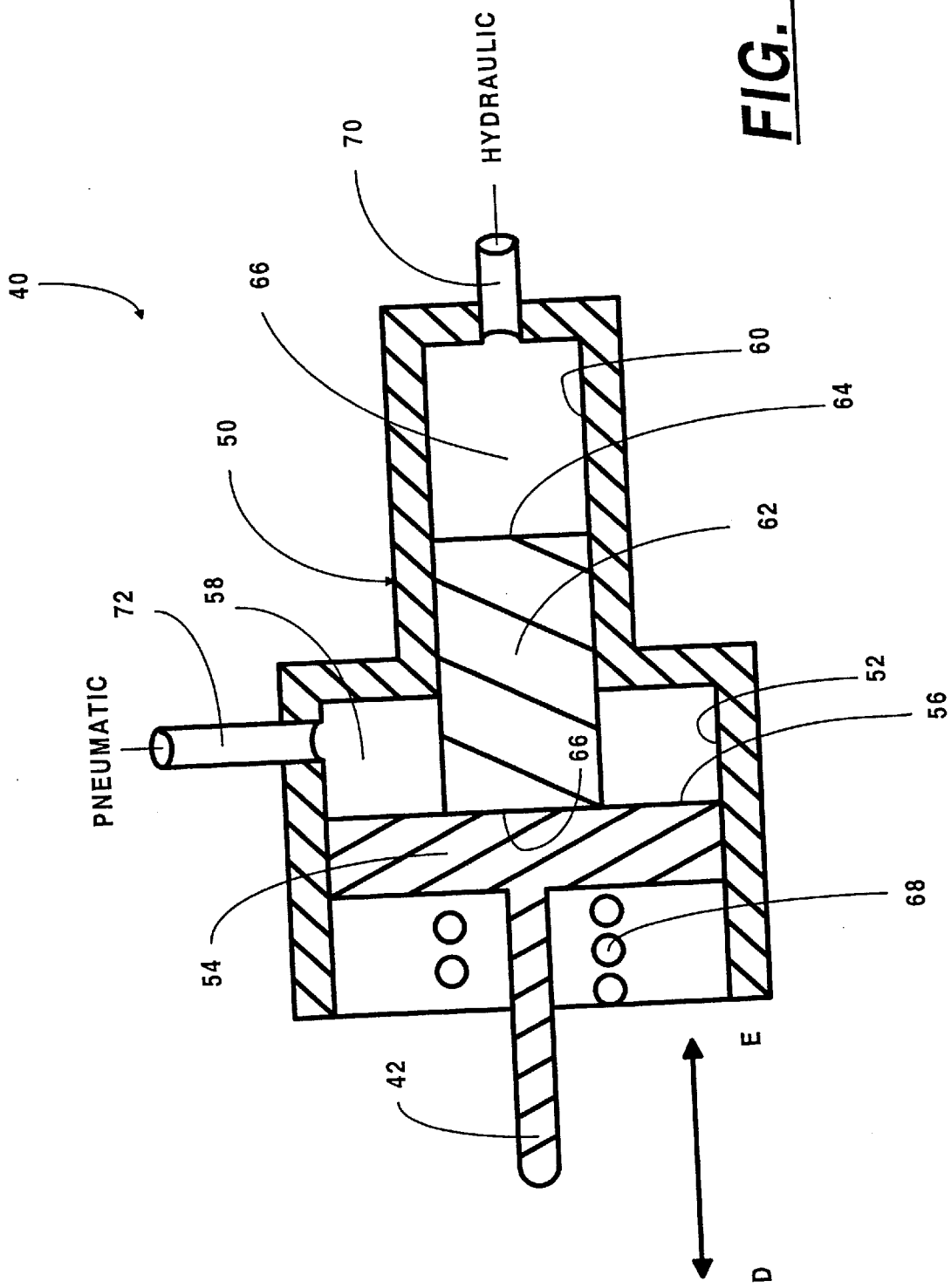
FIG. 3 is a schematic illustration of the combined electric motor-actuated actuator and pressurized fluid-actuated override actuator actuation mechanism of the system of FIG. 1.

The clutch actuator system 27 of the present invention is schematically illustrated in FIGS. 2 and 3. Briefly, the clutch actuator system 27 receives command output signals from ECU 31 to control the engagement and disengagement of master friction clutch C. The clutch actuator system 27 includes a clutch actuator mechanism 40 having a clutch control member 42 movable leftwardly (D) to cause disengagement of clutch C and rightwardly (E) to cause engagement of clutch C. Briefly, control member 42 acts through a pivoted clutch release lever 44 pivoted at pivot point 46 and engaging a clutch release bearing 48 in a known manner. Although the present invention is illustrated in connection with a so-called "push" type clutch, with appropriate rearrangement, it is equally applicable to "pull" type clutches.

Referring to FIG. 3, the clutch control mechanism 40 is contained within a housing 50 having an enlarged diameter bore 52 slidably and sealingly receiving an enlarged piston 54 axially fixed to the clutch control member 42. The enlarged piston 54 includes a piston face 56 exposed to fluid pressure in a chamber 58 defined by the piston face 56 and the enlarged diameter bore 52. The housing also includes a small diameter bore 60 slidably and sealingly receiving a smaller diameter piston 62. Smaller piston 62 has a rightwardly facing face 64 exposed to fluid pressure in a chamber 66 defined by the smaller diameter bore 60 and the piston face 64. The smaller diameter piston 62 has a leftwardly facing surface 67 for abutting engagement with the rightward surface of the enlarged diameter piston 54. Pistons 54 and 62 are independently axially movable in housing 50. A compression spring 68 resiliently biases the piston 54 and control member 42 rightwardly into engagement with the smaller diameter piston 62.

Piston chamber 58 is connected to a selectively pressurized and exhausted pneumatic conduit 77, while piston chamber 66 is connected by a conduit 70 to a source of pressurized hydraulic fluid. As may be seen, leftward axial movements of the piston 62 will result in corresponding movements of piston 54 and control member 42 therewith. While, due to the incompressibility of hydraulic fluid, rightward axial movements of the piston 54 and control member 42 will be limited to the position permitted by abutment with the face 66 of the smaller diameter piston 62. However, upon pressurization of chamber 58, developing a force sufficient to overcome the rightward biasing force of spring 68, the piston 54 and control member 42 are free to move leftwardly relative to the piston 62 and, upon exhaust of chamber 58, will return rightwardly under the bias of spring 68 to contact the piston 62.

As illustrated in FIG. 2 and as described in greater detail below, pressurization of chamber 66 and, thus, the position of piston 62 are controlled by controlled rotation of an electric motor, whereas the pressurization of chamber 58 and, thus, the leftward axial position of piston 54 and control member 42 are controlled by one or more solenoid-controlled pneumatic valves. Hydraulic conduit 70 is connected to a relatively standard hydraulic master cylinder 74 having a connection to a hydraulic reservoir 76 and including an hydraulic piston 78 axially positioned by a pivoted hydraulic piston lever 80, which is pivotably positioned by a ball nut 82 threadably attached to a ball screw 84 selectively rotated in both the clockwise and counterclockwise directions by an electric DC motor 86. The electric DC motor is selectively operated under the commands of output signals from ECU 31. Ball screw and ball ramp mechanisms are well known in the prior art and include a ball nut axially movable in response to rotation of the ball screw. Bearing balls are used in interengaged threads to minimize friction and to transfer loads. Ball screw and ball ramp mechanisms may be appreciated in greater detail by reference to U.S. Pat. Nos. 4,981,202; 4,966,267 and 5,528,950, the disclosures of which are incorporated herein by reference. Ball screw mechanisms, thus, will provide fine control of the axial position of the smaller piston 62 in both the disengaged (D) and engaged (E) positions of the clutch control member 42, as is desirable during vehicle launch and/or inching operations.

The pressurization and/or exhaust of conduit 72 for selectively pressurizing and/or exhausting piston chamber 58 is controlled by a solenoid-controlled valve assembly 90 connected to a source 92 of pressurized air, such as filtered and regulated air from an onboard vehicle compressor or the like. The solenoid-controlled valve assembly 90 also operates in response to command output signals from ECU 31.

Although the electric motor ball screw mechanism is illustrated as positioning the piston 62 through an hydraulic actuator, the piston 62 could be replaced by a member selectively axially positioned directly by the ball nut or by the ball nut through a mechanical linkage.

Thus, it may be seen that precision positioning of the clutch is accomplished by means of the hydraulically operated cylinder 62 under the control of the motor 86 and the ball screw mechanism, whereas when rapid disengagement of the clutch is desired, pressurization of conduit 72 and, thus, piston chamber 58 under the control of the solenoid valve assembly 90 will achieve a rapid disengagement of the clutch, regardless of the position of the small cylinder 62. Preferably, upon disengagement of the clutch by means of pressurizing chamber 58, the ECU will command the DC motor and ball screw mechanism to adjust the supply of hydraulic fluid in chamber 66 such that the piston 62 will be allowed to move rightwardly to the touch point or point of incipient engagement whereby when it is desirable to reengage the clutch C, exhaust of chamber 58 will cause the spring 68 to move the piston 54 rightwardly until the piston 54 will engage the piston 62 at the point of incipient engagement, at which time the electric motor and ball screw mechanism may be utilized to cause an accurate reengagement of the master clutch C.

Accordingly, it may be seen that a master clutch actuator system has been provided for an automated master clutch which allows precise control of the master clutch as necessary during vehicle launch and inching operations, while permitting rapid disengagement of the master clutch when desired and rapid return of the master clutch to the point of incipient engagement during reengagement of the master clutch operations.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A clutch actuation system (10) for an automated vehicular master clutch (C), said system comprising:

a clutch control member (42) movable in a first axial direction (E) to urge said clutch into engagement and in a second axial direction (D), opposite said first axial direction, to urge said clutch into disengagement;

an actuator housing (50) defining a first bore (52) slidably and sealingly receiving a first piston (54), said control member axially movable with said first piston;

an electric motor-actuated device (62) axially movable in said housing, independent of said first piston, said electric motor-actuated device abuttable with said first piston upon movement of said electric motor-actuated device in the second axial direction;

biasing means (68) for resiliently biasing said first piston in said first direction and into abutting contact with said electric motor-actuated device;

said first cylinder and said first piston defining a selectively pressurized and exhausted first chamber, pressurization of which is effective to urge said first piston in said second axial direction independent of the axial position of said electric motor-actuated device;

a control valve assembly (90) connected to a first source (92) of pressurized fluid for selectively pressurizing and exhausting said first chamber;

an electric motor (86) for selectively axially positioning said electric motor-actuated device; and a control unit (31) for controlling said control valve assembly and said electric motor.

2. The system of claim 1 wherein said pressurized fluid is compressed air.

3. The system of claim 2 wherein said control unit is a microprocessor-based controller.

4. The system of claim 2 wherein said electric motor-actuated device is a second piston (62) slidably and sealingly received in a second bore (60) defined in said housing, said second piston and second bore defining a second chamber (66), pressurization of which is effective to urge said second piston in said second axial direction, said second chamber connected to a pressurized second source (76) of liquid controlled by said electric motor.

5. The system of claim 4 wherein said liquid is hydraulic fluid.

6. The system of claim 5 wherein said electric motor controls said source of hydraulic fluid by a mechanism including a ball screw and a ball nut (80, 82, 84).

7. The system of claim 4 wherein said second bore is coaxial with an intersects said first bore, said second bore of a smaller interior diameter than said first bore.

8. The system of claim 4 wherein said biasing means is a compression spring.

9. The actuator system of claim 1 wherein said first piston is an override mechanism for rapidly disengaging the clutch, regardless of positioning of the electric motor-actuated device.

10. A clutch actuation system for an automated vehicular master clutch, said system comprising:

a clutch control member movable in a first axial direction to urge said clutch into engagement and in a second axial direction, opposite said first axial direction, to urge said clutch into disengagement;

an actuator housing defining a first cylinder slidably and sealingly receiving a first piston, said control member axially movable with said first piston, said first cylinder and said first piston defining a selectively pressurized and exhausted first chamber, pressurization of which is effective to urge said first piston in said second axial direction;

an electric motor-actuated device axially movable in said housing, independent of said first piston, said electric motor-actuated device abuttable with said first piston upon movement of said electric motor-actuated device in the second axial direction;

biasing means for resiliently biasing said first piston in said first direction and into abutting contact with said electric motor-actuated device;

a control valve assembly connected to a source of pressurized air for selectively pressurizing and exhausting said first chamber;

an electric motor for selectively axially positioning said electric motor-actuated device; and a control unit for controlling said control valve assembly and said electric motor;

said electric motor-actuated device being a second piston slidably and sealingly received in a second bore defined in said housing, said second piston and second bore defining a second chamber, pressurization of which is effective to urge said second piston in said second axial direction, said second chamber connected to a pressurized source of liquid controlled by said electric motor, said second bore being coaxial with and intersecting said first bore, said second bore of a smaller interior diameter than said first bore.

11. An actuator system (10) for an automated vehicular master clutch (C) including a clutch control member axially movable in a first axial direction to engage the clutch and in a second axial direction to disengage the clutch, an electric motor (86) controlled mechanism (80, 82, 78, 62) for positioning of the clutch control member and a solenoid valve (90) controlled override mechanism (70, 58, 54) for moving said clutch control member in the second axial direction to disengage said clutch, regardless of positioning of the electric motor-controlled mechanism, said override mechanism including a piston (54) exposed to fluid pressure in a selectively pressurized and exhausted chamber (58), said motor-controlled mechanism effective to axially move said control member at a first rate and said override mechanism effective to axially move said control member in said second axial direction at a second rate, said second rate being faster than said first rate, and a microprocessor-based controller (31) for automatically controlling said electric motor and pressurization of said chamber.

* * * * *